Dec. 18, 1945.   A. C. FRANKWICH   2,391,088
TAKE-UP APPARATUS
Filed Aug. 11, 1944   2 Sheets-Sheet 1

INVENTOR
A. C. FRANKWICH
BY
ATTORNEY

Dec. 18, 1945.  A. C. FRANKWICH  2,391,088
TAKE-UP APPARATUS
Filed Aug. 11, 1944  2 Sheets-Sheet 2
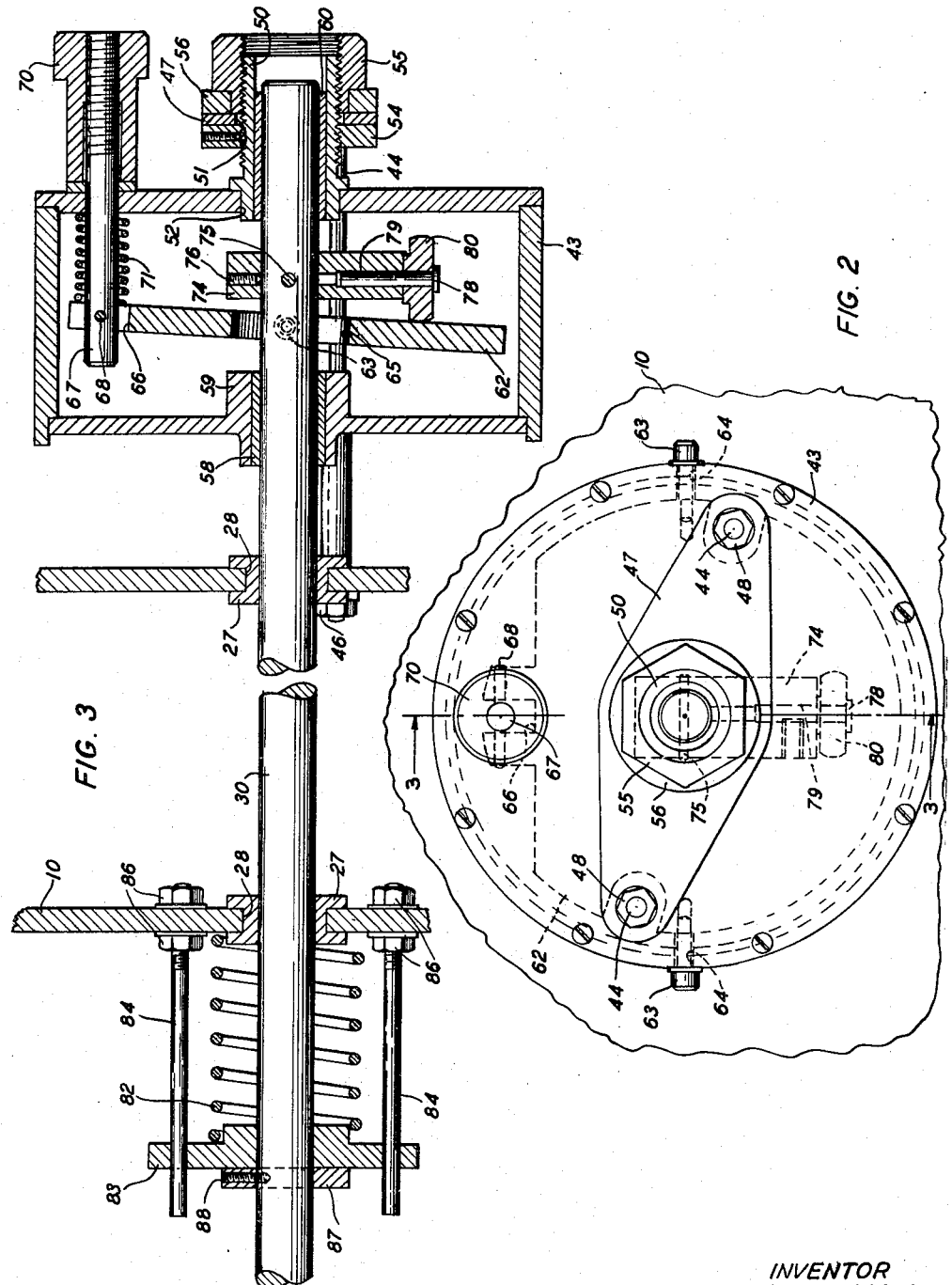
INVENTOR
A.C. FRANKWICH
BY
ATTORNEY Patented Dec. 18, 1945

2,391,088

UNITED STATES PATENT OFFICE 2,391,088

TAKE-UP APPARATUS

Alexander C. Frankwich, Baltimore, Md., assignor to Western Electric Company, Incorporated, New York, N. Y., a corporation of New York Application August 11, 1944, Serial No. 549,012

8 Claims. (Cl. 242—25)

This invention relates to take-up apparatus, and more particularly to apparatus for distributing strands upon a take-up spool.

In the winding of fine wire upon take-up spools it is necessary that the wire be evenly distributed along the entire length of spools upon which such wire is found. Often such spools vary in length and when they are used it is necessary to adjust the throw of the particular means used for distributing the strand thereon.

An object of this invention is to provide new and improved apparatus for distributing strands upon take-up spools.

One device embodying the invention comprises a reciprocable strand distributor, a cam associated with said distributor for reciprocating said distributor along a predetermined path, a shaft for rotating said cam, and means for adjusting the position of said shaft to vary the length of said path.

A complete understanding of the invention may be obtained from the following detailed description of a specific embodiment thereof, when read in conjunction with the appended drawings, in which:

Fig. 2 is an enlarged side elevation of a portion of the device, and

Fig. 3 is an enlarged, fragmentary, vertical sectional view of a portion of the device taken along line 3—3 of Fig. 2.

Figure 1:
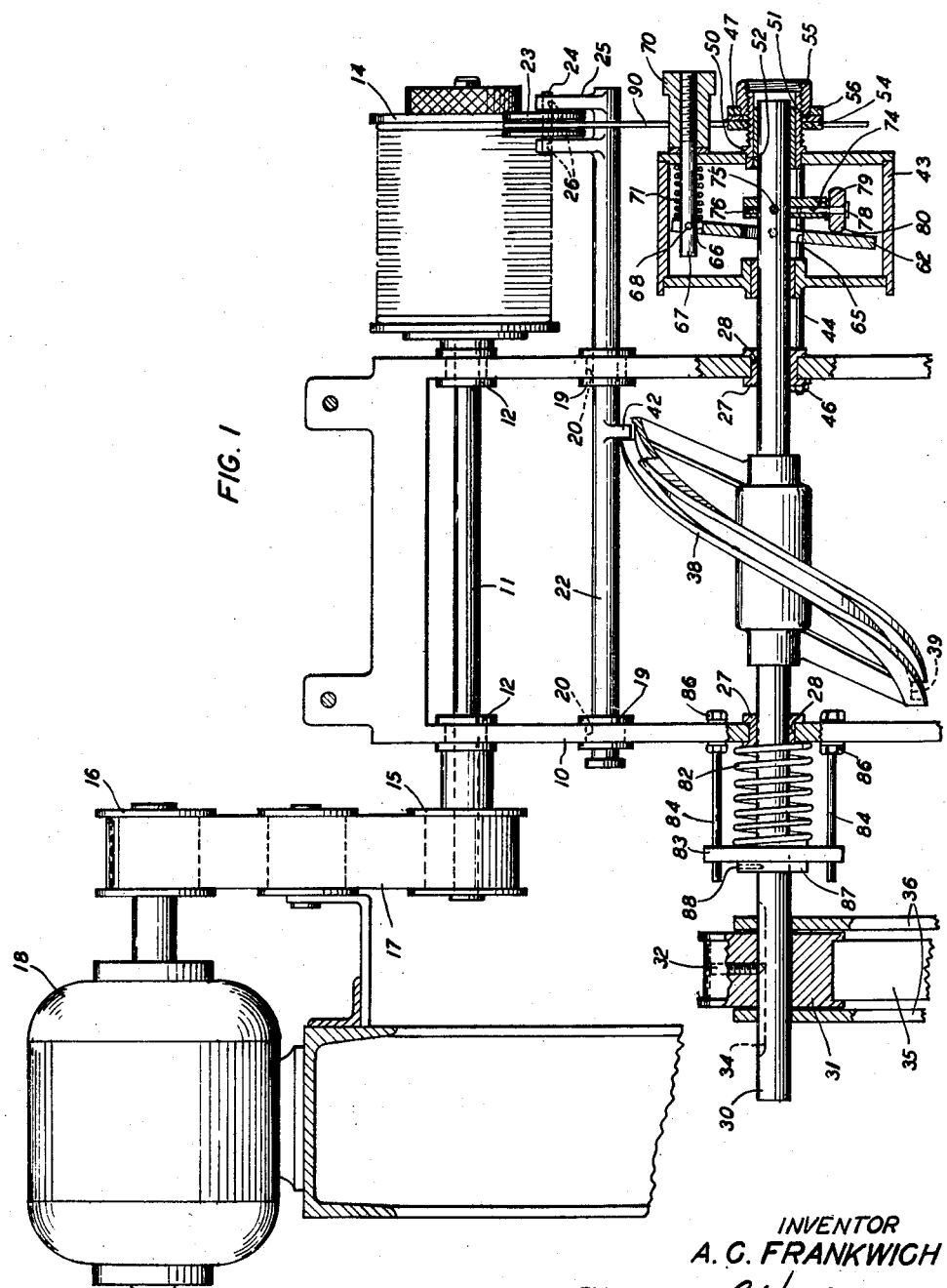
Fig. 1 is a fragmentary front elevation of a device embodying the invention with portions thereof broken away.

Referring now in detail to the drawings, a frame 10 (Fig. 1) rotatably supports a shaft 11 which is mounted in bearings 12—12 secured to the frame. Upon one end of the shaft 11 a take-up spool 14 is secured and upon the other end a pulley 15 is mounted. A pulley 16 driven by an electric motor 18 drives a belt 17 to rotate the pulley 15 and the shaft 11.

A pair of bearings 19—19 are mounted in apertures 20—20 formed in the frame 10 and serve to support a traversing arm 22, which has a grooved roller 23 rotatably mounted upon a pin 24 secured in a pair of apertures 26—26 formed in a fork 25 formed at one end of the traversing arm 22.

A pair of bearings 27—27 (Figs. 1 and 3) secured in apertures 28—28 formed in the frame 10 rotatably support a shaft 30. The shaft 30 is driven by a sheave 31 (Fig. 1) to which the shaft is slidably secured by a set screw 32, which projects into a slotted keyway 34 formed in the shaft 30. The sheave 31 is rotated by a belt 35 driven by any suitable source of power (not shown). A pair of standards 36—36 serve to prevent the sheave 31 from sliding along its axis of rotation when the shaft is so slid.

A butterfly cam 38 of a conventional type having a helical peripheral groove 39 formed therein is secured upon the shaft 30. A cam follower 42 secured to the traversing arm 22 fits into the peripheral groove 39 and reciprocates the traversing arm 22 when the shaft 30 and the cam 38 secured thereon are rotated by the sheave 31. The distance between the inner surfaces of the flanges of the spool 14 is approximately equal to the horizontal distance between the upper and lower points on the center line of the peripheral groove 39, when the cam is in the position shown in the drawings.

A housing 43 is secured over one end of the shaft 30 by a pair of rods 44—44 secured to the frame 10 by nuts such as a nut 46. A plate 47 (Fig. 2) is secured to the rods 44—44 by a pair of nuts 48—48 and serves to support a nipple 50 in an aperture 51 formed therein. The nipple 50 passes through an aperture 52 formed in the housing 43, and is secured to the plate 47 by a nut 54 threaded thereon and a nut 55, which is threaded upon the opposite side of the plate 47 and presses a lock washer 56 thereagainst. A bushing 58 is mounted in a bearing 59 formed on the housing 43 and a bushing 60 is mounted in the nipple 50. The bushings 58 and 60 are aligned with the bearings 27—27 and serve to mount the right hand end of the shaft 30, as viewed in Figs. 1 and 3.

A pair of pins 63—63 (Fig. 2) extend through a pair of apertures 64—64 formed in opposite sides of the housing 43. The pins 63—63 mount a plate 62 pivotally about a horizontal axis intersecting and perpendicular to the longitudinal axis of the shaft 30, which passes through an opening 65 formed in the plate 62. One end of a bolt 67 projects into a slot 66 formed in the plate 62, and a pin 68 (Fig. 3) serves to pivotally secure the end of the bolt 67 to the plate 62. A nut 70 secured upon the other end of the bolt 67 and a spring 71 mounted upon the bolt 67 serve to adjustably secure the plate 62 at any desired angle with respect to the axis of rotation of the shaft 30.

An arm 74 (Fig. 3) rigidly secured upon the shaft 30 by a pin 75 and a set screw 76 carries a pin 78 threaded into a bore 79 formed in the arm 74. The pin 78 serves to rotatably secure a roller 80 upon the end of the arm 74.

A compression spring 82 is mounted between a plate 83 and the left side of the frame 10, as viewed in Fig. 3. The plate 83 is slidably mounted upon the shaft 30 by a pair of rods 84—84 secured to the housing by a plurality of nuts 86—86. A collar 87 is secured upon the shaft 30 by a set screw 88. The plate 83 is pressed by the spring 82 against the collar 87, whereby the shaft 30 is urged to the left and the roller 80 is pressed against the plate 62 and is reciprocated along its axis of rotation as it is rotated and the roller 80 is rotated over the surface of the plate 62.

The arm 74, the plate 62 and the cam 38 are so mounted relative to the shaft 30 and to each other that when the traversing arm 22 reaches one end of its path of movement, the shaft 30 reaches an extremity of its reciprocating movement. This will be true regardless of the particular position to which the plate 62 is adjusted.

In the operation of the above described apparatus, the speeds of the motor 18 and the belt 35 are synchronized by a conventional synchronizing mechanism (not shown) so that a fine wire 90 (Fig. 1) being wound upon the spool 14 will be wound upon the spool in even, closely adjacent turns as the traversing arm reciprocates the grooved roller 23 and the spool 14 is rotated. One layer of the wire 90 will be formed on the core of the spool 14 during each half-revolution of the butterfly cam 38.

In winding fine wire such as the fine wire 90 upon spools, it is imperative that the windings of such wire be formed closely adjacent to each other and extend from flange to flange. Often spools such as the spool 14 vary slightly in length and consequently the length of reciprocation of the traversing devices must be varied accordingly. The distance of reciprocation of the traversing arm 22 may be varied by adjusting the plate 62 with respect to the shaft 30.

When the plate 62 is in the position shown in the drawings, as the traversing arm 22 reaches its extreme right hand position the shaft 30 and the butterfly cam 38 secured thereon are forced by the spring 82 to their extreme left hand positions. The action of the spring 82 maintains the roller 80 in contact with the plate 62. When the arm 22 is in its extreme left hand position, the shaft 30 is pulled to the right against the action of the spring 82 by the roller 80 and the arm 74. Thus, as the butterfly cam 38 forces the traversing arm 22 in one direction, the shaft 30 and the cam 38 are moved in the opposite direction.

If it is desired to shorten the length of reciprocation of the arm 22, the nut 70 is threaded farther on the bolt 67, whereby the plate 62 is rotated in a clockwise direction, as viewed in Fig. 1.

Conversely, if the distance of reciprocation of the traversing arms is to be lengthened, the plate 62 is rotated in a counterclockwise direction, as viewed in Fig. 1, and when the traversing arm 22 is in its extreme right hand position, the shaft 30 will be thrust somewhat to the right. When the traversing arm is moved to its extreme left hand position, the shaft 30 and the butterfly cam 38 will also have been moved farther to the left than it would in the adjustment of the apparatus, as shown in Fig. 1.

The adjustment of the above-described longitudinal reciprocation of the shaft 30 and the butterfly cam 38 secured thereon does not substantially affect the uniformity of the rate of linear movement of the traversing arm 22 during the reciprocation of the traversing arm. That is, the rate of the linear speed of the longitudinal movement of the shaft 30 will be substantially uniform during the operation of the apparatus at any given adjustment of the plate 62. Consequently the wire 90 will be wound upon the spool 14 in even, parallel windings.

Very fine adjustments of the length of reciprocation of the traverse arm 22 may be effected, thus making the apparatus suitable either for worn and spread spools of the same original size or for spools originally of different lengths.

What is claimed is:

1. In a take-up apparatus, a reciprocable strand distributor, a cam associated with said distributor for reciprocating said distributor along a predetermined path, a shaft on which the cam is mounted for rotating said cam, and means for adjusting the position of said shaft to vary the length of said path.

2. In a take-up apparatus, a reciprocal strand distributor, a shaft, means for rotating said shaft, a butterfly cam secured to said shaft for reciprocating said distributor along a path of predetermined length, means for reciprocating said shaft along the axis of rotation thereof, and means for adjusting said last-mentioned means for varying the distance of reciprocation of said shaft.

3. In a take-up apparatus, a shaft, means for rotating said shaft, a grooved cam secured on said shaft obliquely thereto, means for urging the shaft in one direction along the axis thereof, means for moving the shaft a predetermined distance in the opposite direction along the axis thereof when said shaft is rotated, and means for adjusting said last-mentioned means for varying said distance of movement along said axis.

4. In a take-up apparatus, a shaft, means for rotating said shaft, a butterfly cam secured on said shaft, a plate, means for mounting said plate at an angle with respect to said shaft, a cam follower secured to said shaft, and means for urging said shaft along the axis thereof to press the follower against the plate.

5. In a take-up apparatus, a shaft, means for rotating said shaft, a butterfly cam secured to said shaft, a plate, means for mounting said plate at an angle with respect to said shaft, a cam follower secured to said shaft, means for urging said shaft along the axis thereof to press the follower against the plate, and means for adjusting said mounting means.

6. In a take-up apparatus, a shaft, a driving sheave slidably secured to said shaft for driving said shaft, a cam having a groove formed in the periphery thereof secured upon said shaft, a plate having an opening therein through which said shaft passes, means for mounting said plate pivotally about an axis transverse to and intersecting the axis of said shaft, means for securing said plate at a predetermined angle with respect to the axis of said shaft, a cam follower secured to said shaft at a point adjacent to said plate, and means for urging said cam follower against the plate.

7. In a take-up apparatus, a shaft, a sheave slidably secured to said shaft, a cam having a groove formed in the periphery thereof secured upon said shaft at an acute angle with respect to said shaft, a plate having an opening therein through which said shaft passes, means for mounting said plate pivotally about an axis transverse to and intersecting the axis of said shaft, means for securing said plate at a predetermined angle with respect to the axis of said shaft, a cam follower secured to the said shaft adjacent to said plate, means for adjusting said plate, securing means to vary the angle formed by the plate and the axis of the shaft, and means for urging the follower against the plate.

8. In a take-up apparatus, a traversing arm mounted for reciprocation, a shaft, means for rotatably and slidably supporting said shaft, a sheave in which the shaft is slidably mounted for rotating said shaft, a cam having a peripheral groove formed therearound and being rigidly secured to said shaft for rotation therewith to reciprocate said traversing arm along a path of predetermined length, a housing mounted around one end of said shaft, a plate pivotally mounted in said housing about an axis perpendicular to and intersecting the axis of said shaft, said plate having a central aperture formed therein through which said shaft passes, a bolt secured to said plate, a nut for adjustably positioning said bolt to secure the plate at any desired angle with respect to the shaft, an arm secured upon said shaft for rotation therewith, a roller rotatably mounted on the last-mentioned arm, and means for urging said shaft along the axis thereof to press the roller against said plate.

ALEXANDER C. FRANKWICH.